United States Patent [19]

Forbat et al.

[11] 3,979,740

[45] Sept. 7, 1976

[54] MONITORING SYSTEM

[75] Inventors: John Egon Forbat, Weybridge; John Robert Digby, Fleet; Timothy Alan Roper, Guildford, all of England

[73] Assignee: Inertia Switch Limited, Hartley Witney, England

[22] Filed: June 10, 1974

[21] Appl. No.: 477,941

[30] Foreign Application Priority Data

Nov. 6, 1973 United Kingdom............... 27675/73

[52] U.S. Cl............................... 340/276; 340/309.1; 317/141 S

[51] Int. Cl.$^2$.................... G01D 21/04; G08B 13/00

[58] Field of Search............. 340/276, 309.1, 309.4, 340/274, 261, 409; 235/92 FP; 317/141 S, 265, 268, 269

[56] References Cited

UNITED STATES PATENTS

| | | | |
|---|---|---|---|
| 3,553,730 | 1/1971 | Kaplin et al. | 340/276 |
| 3,680,073 | 7/1972 | Humphrey et al. | 340/276 |
| 3,808,407 | 4/1974 | Ratz | 235/92 FP |

*Primary Examiner*—John W. Caldwell
*Assistant Examiner*—William M. Wannisky
*Attorney, Agent, or Firm*—Woodhams, Blanchard and Flynn

[57] ABSTRACT

A monitoring system for use as an intruder alarm. The system which is designed to reduce the likelihood of generating false alarms, e.g. alarms generated in the absence of an attempt to break in to premises protected by the system but in the presence of some other occurrence, includes a sensor circuit having at least one set of normally-closed contacts coupled in series between terminal means for coupling the circuit to a source of current and output means coupled to the sensor circuit for providing, in use, a first output signal upon actuation of a set of contacts for a predetermined time interval the length of which may be varied as desired. The system includes pulse generating means for providing the first output signal in the form of pulses, timing means for defining said interval and counting means for counting the output pulses during the said interval and for providing a further output signal when the number of pulses counted in the said interval equals or exceeds a predetermined value.

36 Claims, 4 Drawing Figures

MONITORING SYSTEM

The present invention relates to monitoring systems such as vibration responsive systems and intruder protection systems for buildings and the like.

In copending application, Ser. No. 369,956 filed June 14, 1973, entitled "Improvements in or relating to protective systems" which names A. H. Smith and J. E. Forbat as joint inventors and which is assigned to the assignee of the present application there are illustrated and described monitoring systems which comprises a sensor circuit including at least one set of normally-closed contacts coupled in series between terminal means for coupling the circuit to a source of current and output means coupled to the sensor circuit for providing, in use, a first output signal upon actuation of a set of contacts for a predetermined period, and means for varying the length of the predetermined period. The sensor circuit may comprise a set of normally-open parallel connected contacts and the output means is arranged to provide a second output signal upon actuation of a set of normally-open contacts.

It has been found that in certain applications, the systems according to the invention disclosed and claimed in the aforesaid copending application are liable to generate a false alarm, that is an alarm is generated in the absence of an attempt to break-in to premises protected by the system but in the presence of some other occurrence. For example, if a system is employed to provide an alarm if an intruder attempts to break through a fence to one side of which the public or animals have access then anyone or anything accidentally or deliberately knocking against or shaking the fence may cause one of the sets of contacts to vibrate sufficiently to actuate the alarm.

The system according to the present invention has been developed with the object of reducing the likelihood of such false alarms and is based on the realisation that to break-in to certain areas, for example, by severing a plurality of links in a chain-link fence it is neccessary to take a plurality of deliberate actions. For example, it is found that in practice it is necessary to cut at least 12 links in a typical chain link fence to make a hole large enough for a person to pass through. The links would, of course, have to be cut in a finite period of time and each cut would cause one output signal to be generated by the system. This development of the invention provides a system which allows the user to preselect, within given practical limits, the number of such output signals which must occur in a predetermined time interval to provide an alarm output signal. The number of output signals and the length of the interval selected are a compromise suited to the situation; if the number of output signals is too small, say one signal and the period too long then a false alarm signal would be generated too often; if the number is too high and the period too small then a break-in could be effected without a genuine alarm being raised. In the system as developed the number may be preselected from one to 16 output signals and the time interval may be varied from about 6 seconds to about 60 minutes but these values will depend to some extent on the circumstances.

With the foregoing and other objects in view, the present invention contemplates modifications in the system disclosed and claimed in our aforesaid copending application which modifications comprise pulse generating means for providing the first output signal in the form of a pulse, timing means for defining said interval and counting means for counting the output pulses during the said interval and for providing a third, or further, output signal when the number of pulses counted in the said interval equals or exceeds a predetermined value.

The pulse generating means may consist of a bistate device arranged to change from a first state to a second state when a set of contacts have been actuated for the said predetermined period and to return to the first state after another predetermined period to define the said pulse width. The bistate device may comprise a relay having delay means for maintaining it in its second state for the said period.

The system according to the invention preferably includes means for varying the pulse width of the output pulses which width may be variable between approximately 50 and 1000 milliseconds and the timing means preferably includes means for varying the length of said time interval from approximately 5 seconds to approximately 60 minutes.

The timing means may be triggered to start the said time interval by an output pulse and may comprise a first monostable multivibrator circuit having its input coupled to the output of the pulse generating means and its output arranged to allow the counting means to count pulses only during the said time interval.

The counting means may comprise a counter having a plurality of binary stages and means for selectively coupling the output of selected stages of the counter to gate means arranged to provide an output signal when the count in the counter reaches the predetermined value.

The system may also include means for inhibiting the generation of the third output signal, means for determining the rate at which first output pulses are generated and/or providing an output signal when the first output pulses occur at a rate not less than a predetermined rate and for a predetermined duration, and means for counting the output signals and for providing a fourth output signal when the number of the last said output signals equals or exceeds a predetermined value. The inhibiting means may comprise gate means coupled between the output of the pulse generating means and the input of the counting means and control means connected to the output of the pulse rate counter for closing the gate when the first output pulses occur at a rate greater than or equal to the said predetermined rate.

Other features which may be included in accordance with the invention will be described hereinafter and referred to in the appended claims.

The invention will now be more particularly described solely by way of example with reference to the accompany drawings, in which.

Figure 1:
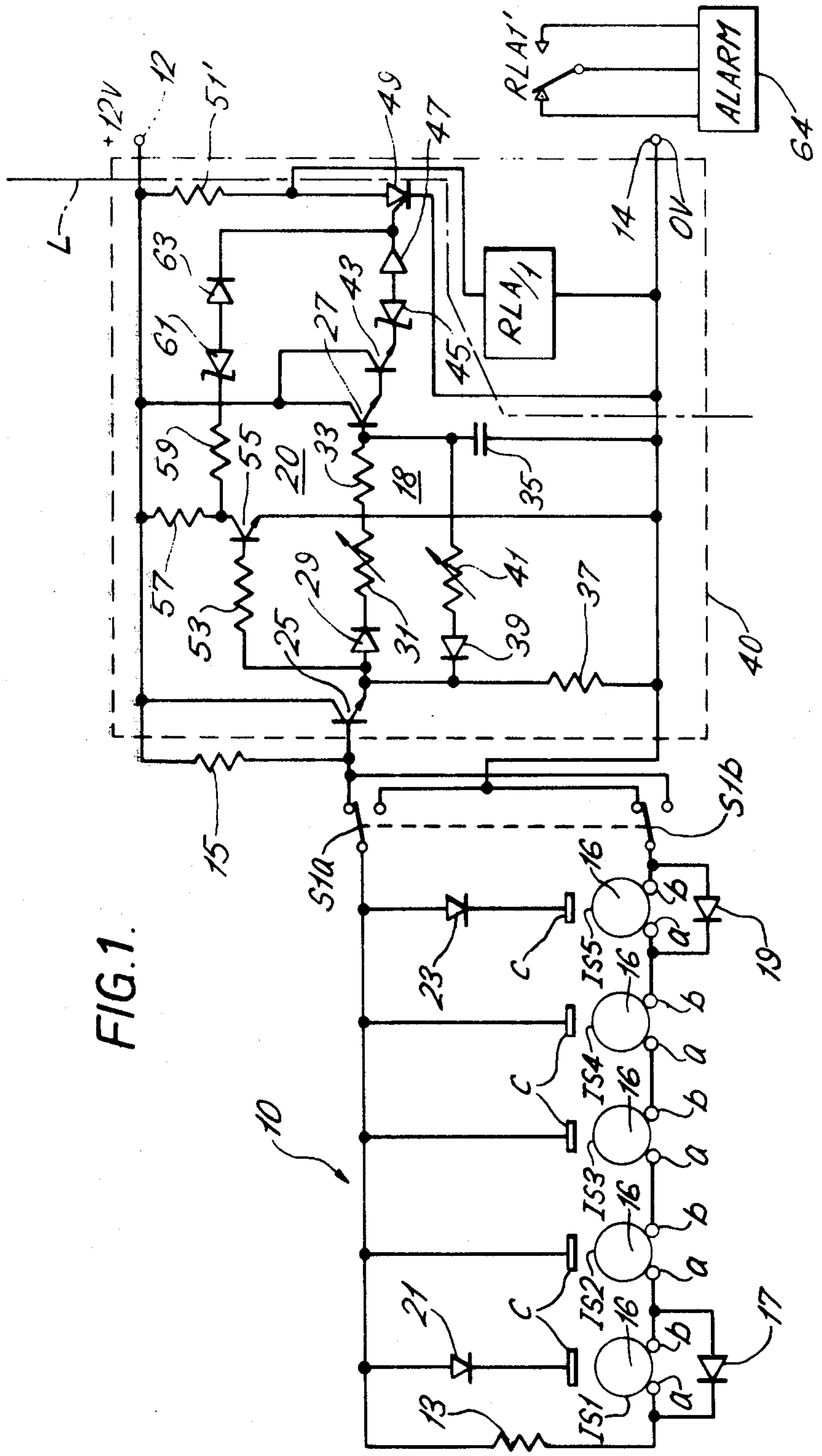
FIG. 1 is a circuit diagram of one embodiment of a monitoring system for use as an intruder protective system according to the invention disclosed and claimed in our aforesaid copending application.

Referring to FIG. 1 and as described in the aforesaid copending application, there is shown a protective system comprising a sensor circuit 10 comprising five sets IS1 to IS5 of sensors having normally-closed contacts *a* and *b* connected in series. Each sensor also has a normally-open contact *c*. The sets of contacts *a*, *b* are coupled through a resistor 13, a changeover switch S1*a* and a resistor 15 to a terminal 12, and through a changeover switch S1*b* to a terminal 14. The contact *c* of each sensor is connected in parallel across the circuit. In operation, the terminal 12 and 14 are connected to the positive and negative terminals respectively of a 12 volt source.

The sensors may be of the kind sold by the present assignee under the name Inertia Switch or Inertia Sensor. Two such sensors are disclosed in U.K. patent specification Nos. 1,162,994 and 1,263,076. In operation if the sensor is fitted to a door of a room to be protected, interference to the door, such as continuous hammering or sawing to effect entry, will cause a conductive ball 16 to vibrate on the contacts *a*, *b* and hence produce intermittent open circuit conditions which will break up the direct current from the source into a series of pulses. If the door is opened then the ball 16 makes a circuit between its associated contacts *c*, *b*.

The switches S1*a* and S1*b* are ganged together so that in use the circuit 10 has two operative modes, in one mode current flows in a direction from IS1 towards IS5 and in the other current flows in a direction from IS5 to IS1.

Unidirectional conducting devices in the form of semiconductor diodes 17 and 19 poled as shown are connected across the contact sets IS1 and IS5 respectively and diodes 21 and 23 poled as shown are connected in series with the contacts *c* of respective sensors IS1 and IS5.

An output circuit shown within a broken line 40 comprising a first, integrating circuit 18 is coupled to the sensor circuit 10 between the junction of the switch S1*a* with the resistor 15. The integration circuit 18 comprises an NPN transistor 25 having its base connected to the junction of switch S1*a* with resistor 15, its collector connected to the terminal 12 and its emitter coupled to the base of an NPN transistor 27 through a diode 29 poled as shown, a variable resistor 31 and a fixed resistor 33. An integrating capacitor 35 is coupled between the base of transistor 27 and terminal 14. A resistor 37 is connected between the emitter of transistor 25 and the terminal 14. A diode 39 and variable resistor 41 are connected in series between the emitter of transistor 25 and the base of transistor 27. The components 37, 39 and 41 form a rapid reset circuit for the integration circuit as described hereinafter.

The capacitor 35 is coupled through a compound emitter follower circuit comprising NPN transistor 27 and 43, a Zener diode 45 and diode 47 poled as shown to the gate electrode of a silicon controlled rectifier 49, of which the anode is coupled through a resistor 51' to the terminal 12 and the cathode is connected to the terminal 14. The winding of a relay RLA/1 is coupled between the terminal 14 and the junction of the anode of the SCR 49 with resistor 51'. The relay RLA/1 has changeover contacts RLA1' coupled to actuate an alarm 64 in one operative state of the relay.

In operation, the relay RLA/1 is normally energised. The output circuit 40 comprises a second circuit 20, coupled to the junction of S1*a* with resistor 15. The circuit 20 comprises the transistor 25, a resistor 53 coupled between the emitter of transistor 25 and the base of an NPN transistor 55, of which the emitter is connected to terminal 14 and the collector is coupled through a resistor 57 to the terminal 12 and through a resistor 59, a Zener diode 61 and a diode 63 (both poled as shown) to the gate electrode of the SCR 49.

In operation the value of resistor 13 is adjusted until the magnitude of the current through it and the normally-closed contacts of the sensor circuit 10 is a suitable value, say 100 micro-amps. The sensor would be fitted to doors, windows and the like of a room or building to be protected or to a perimeter fence around an area to be protected. The relay RLA/1 is energised through resistor 51'.

With the switches as shown a current of about 100 micro-amps flows from the terminal 12 through resistors 15, 13, switch S1*a*, the sensors IS1 to IS5 and switch S1*b* to terminal 14. In this mode of operation diodes 17 and 19 are reverse biased and diodes 21 and 23 are forward biased. Under slight disturbing influences of, say a door associated with sensor IS5, the ball 16 of sensor IS5 will vibrate on the normally-closed contacts and the current through the circuit will be momentarily interrupted, larger disturbances will cause the ball 16 to short-circuit the normally-open contacts.

In the case of small disturbances the current through the sensor circuit will be interrupted and the voltage level at the base of transistor 25, the input to the integrator 18, will rise to charge the capacitor 35. If the disturbance continues for a predetermined period set by variable resistor 31 the capacitor will charge until it is at a level sufficient to fire SCR 49 by way of diodes 45 and 47. When the SCR fires it short circuits the winding of relay RLA/1. Relay RLA/1 is thus de-energised and an alarm is actuated.

If the disturbance is of sufficient magnitude to cause the ball 16 of a sensor to connect the normally-open contact, or the door etc. to which the sensor is fitted is opened then the base of transistor 25 is effectively short circuited to terminal 14. The voltage at the base of transistor 25 tends to Zero voltage and the SCR 49 is fired by way of the second circuit 20, to de-energise the relay. Thus a first output signal may be generated to fire SCR 49 when the normally-closed contacts are opened, and a second output signal is generated to fire SCR 49 when the normally-open contacts of a sensor are closed.

With regard to the operation of the integrating circuit 18 it is important that intermittent but unrelated random disturbances are not continuously integrated to such an extent that the charge on the capacitor 35 increases until it reaches a value at which it fires the SCR 49. To prevent this a rapid run-down, or reset, circuit comprising resistor 31, diode 39 and variable resistor 41 is provided. The time constant of this circuit is selected such that abnormal occurrences such as occur when an attempt is made to break-in to protected premises actuate the alarm, but legitimate occurrences such as a person knocking at a protected door do not actuate the alarm. The variable resistor 31 is used to set the desired time constant.

Another important aspect of the invention is in the selection of the value of resistance of the resistor 13. The resistor may be a fixed resistor of preselected value or a variable resistor adjusted empirically to a threshold level whereby a person tampering with the circuit in such a way as to effectively place another resistance in series or in parallel with resistor 13 will alter the circuit characteristics to such an extent that the alarm is actuated.

In a second mode of operation the switch S1*a* and S1*b* are changed over to reverse the direction of flow of current through the sensors IS1 to IS5. In this mode of operation disturbances of sensors IS2, IS3 or IS4 will cause the alarm to operate as described but disturbance of sensors IS1 or IS5 is rendered ineffective by means of their associated diodes. Diodes 17 and 19 are forward biased effectively maintaining the short-circuit across their respective contacts, diodes 21 and 23 are reverse biased to maintain the open cicuit in the parallel connections.

Thus the system could be operated in the first mode when it is desired that all of the sensors should be effective, during hours of darkness for example, and in the second mode when it is desired that selected sensors should be ineffective, during daylight hours for example.

Figure 2:
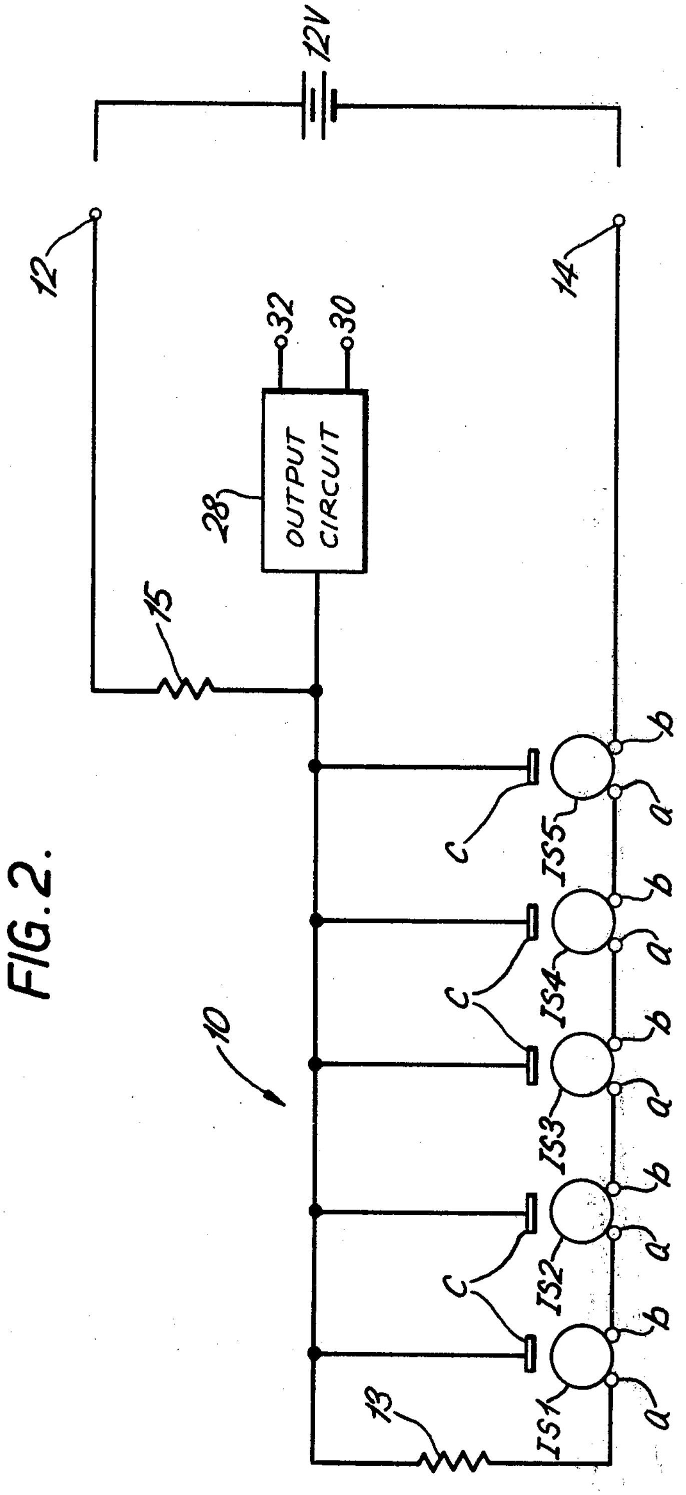
FIG. 2 is a schematic circuit diagram of another embodiment of a protective system according to the invention described and claimed in the aforesaid copending application.

FIG. 2 shows a second embodiment of a protective system according to the invention disclosed in the aforesaid copending application and which, as described therein, comprises a sensor circuit 10 somewhat similar to that described with respect to FIG. 1. Connected to the junction of resistor 13 with resistor 15 is an output circuit 28 arranged to provide an output signal at a terminal 30 when any one or more of the normally-closed contacts of sensors IS1 to IS5 is actuated for a predetermined period. The circuit 28 includes a timer which can be adjusted to vary the length of the predetermined period to give two (or more) operative modes.

The circuit 28 includes a second output terminal 32 which provides a second output signal substantially instantaneously upon actuation of one or more of the sets of normally-open contacts of the sensor. Alternatively, the circuit could be so arranged that the second output signal is provided at terminal 32 after a set of normally-open sensor contacts have been actuated for a predetermined time.

It has been found that in certain applications, the systems according to the invention disclosed and claimed in the aforesaid copending application and described in the foregoing with reference to FIGS. 1 and 2 are liable to generate a false alarm, that is an alarm is generated in the absence of an attempt to break-in to premises protected by the system but in the presence of some other occurrence. For example, if a system is employed to provide an alarm if an intruder attempts to break through a fence to one side of which the public or animals have access then anyone or anything accidentally or deliberately knocking against or shaking the fence may cause one of the switches IS to vibrate sufficiently to actuate the alarm.

Figure 3:
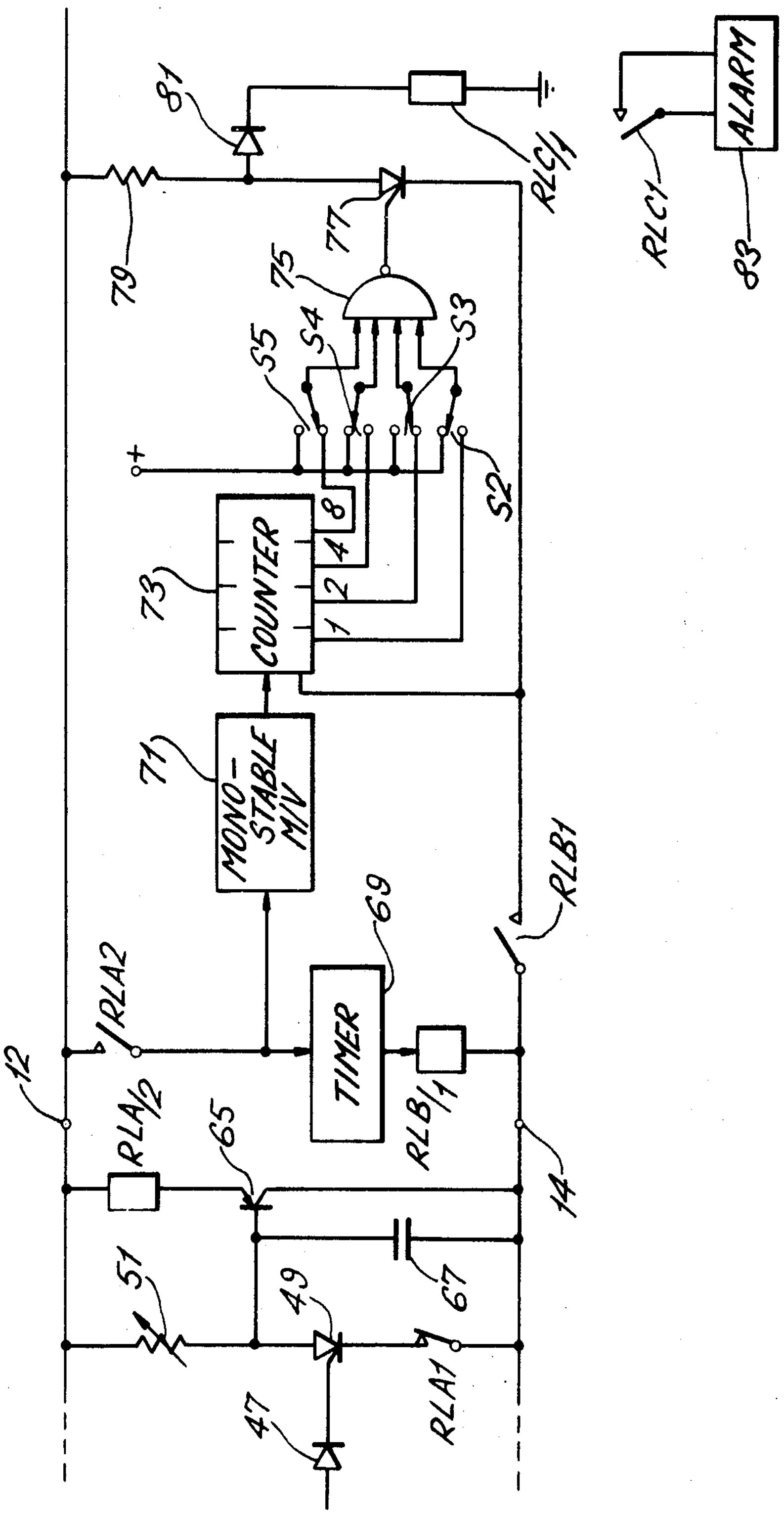
FIG. 3 is a schematic circuit diagram of a modification according to the present invention for use with the systems of FIG. 1 or FIG. 2.

The system according to the present invention as shown in FIG. 3 has been developed to reduce the likelihood of such false alarms. The development shown in FIG. 3 is based on the realisation that to break-in to certain areas, for example, by severing a plurality of links in a chain-link fence it is necessary to take a plurality of deliberate actions. For example, it is found that in practice it is necessary to cut at least 12 links in a typical chain link fence to make a hole large enough for a person to pass through. The links would, of course, have to be cut in a finite period of time and each cut would cause one output signal to be generated by the system. This development of the invention provides a system which allows the user to preselect, within given practical limits, the number of such output signals which must occur in a predetermined time interval to provide an alarm output signal. The number of output signals and the length of the interval selected are a compromise suited to the situation; if the number of output signals is too small, say one signal and the period too long then a false alarm signal would be generated too often; if the number is too high and the period too small then a break-in could be effected without a genuine alarm being raised. In the system as developed the number may be preselected from one to sixteen output signals and the time interval may be varied from about six seconds to about sixty minutes but these values will depend to some extent on the circumstances.

Reference is now made to FIG. 3 which shows a development according to the present invention connected to the circuit of FIG. 1, which latter circuit has been modified slightly and only the modified part thereof is shown in FIG. 3. For visual ease in relating the drawings, the portions of FIG. 1 to the left of the chain line L is substantially the portion useable with the FIG. 3 circuit. In FIG. 3 the anode of SCR 49 of FIG. 1 is coupled through the resistor 51 which is now made variable (but otherwise corresponds to resistor 51' of FIG. 1) and the cathode is connected to signal ground through normally-closed contacts RLA1 of a relay RLA/2. The anode of the SCR 49 is also coupled to the base of a PNP transistor 65 and through a capacitor 67 to the terminal 14. The collector of transistor 65 is connected to terminal 14 and the emitter is coupled through relay coil RLA/2 to terminal 12.

In operation of this part of the circuit when SCR 49 is fired the resulting current therethrough tends to ground the base of transistor 65 causing the transistor to conduct and energise the relay RLA/2. When relay RLA/2 is energised the contacts RLA1 open to break the circuit to SCR 49 and contacts RLA2 close. When contacts RLA1 open the SCR ceases to conduct and capacitor 67 starts to charge through resistor 51 until the potential across it is sufficient to cut-off transistor 65 and de-energise relay RLA/2. RLA1 then closes and RLA2 opens. Thus it will be seen that the SCR is inhibited from firing again until the relay is reset. This prevents the generation of a large number of output pulses from a single long pulse from the sensor loop. The inhibit time which effectively limits the firing rate of the SCR is determined by the time constant of resistor 51 and capacitor 67 and may be varied by adjusting resistor 51, between about 50 and 1000 msecs.

Thus each time the SCR 49 is fired, the closure of contacts RLA2 causes a voltage pulse of between 50 and 1000 msecs duration to be applied to the input of a timer circuit 69. The timer circuit 69 is a monostable circuit arranged to produce an output pulse of predetermined length, variable between approximately 6 seconds and 60 minutes, on receipt of a pulse at its input. The output of the timer 69 is coupled through a relay coil RLB/1 to the terminal 14. An output pulse from timer 69 energises RLB/1 to close contacts RLB1 and thus make the signal ground connection for the remainder of the system still to be described.

The voltage pulse provided by the actuation of relay contacts RLA2 is also coupled to the input of a monostable multivibrator circuit 71 which provides a pulse of predetermined magnitude and duration to a pulse counter 73. The monostable circuit 71 serves as a pulse shaper for pulses applied to its input and prevents spurious pulses, caused by contact bounce of the contacts RLA2 for example, from being counted by the counter 73. The counter 73 is a conventional arrangement of four stages of bistable circuits. Thus by suitable selection of the outputs of the four stages any count from 1 pulse to 16 pulses can be selected. The output of each stage of the counter 73 is connected to a fixed contact of an associated changeover switch S2 to S5, the other fixed contact of each switch being connected to a source of voltage having a magnitude of the same order as the output level of a counter stage with a count present. The moving contact of each of the switches S2 to S5 is connected to a respective input of a NAND gate 75. The output of the NAND gate 75 is connected to the trigger electrode of an SCR 77, the anode of which is coupled to the terminal 12 by way of a resistor 79, and the cathode of which is coupled by way of normally-open relay contacts to terminal 14. The anode of SCR 77 is also coupled through a diode 81 poled as shown and a relay coil RLC/1 to signal ground. Relay RLC/1 is normally energised. When SCR 77 fires relay RLC/1 is de-energised and contacts RLC/1 close to operate an alarm 83.

In operation resistor 51 is adjusted to set the maximum repetition rate of firing of SCR 49 and therefore the pulses applied to the timer 69 and monostable multivibrator 71 and the switches S2 to S5 are set to select the number of pulses to be counted in a preselected time determined by adjustment of the monostable circuit 69, before the alarm 83 is operated.

With the switches set as shown 10 output pulses (8 + 2) must be generated by a system according to FIG. 1 in order to operate the alarm 83.

The alarm may be an audible or visual alarm or both.

The circuit of FIG. 3 could also be arranged to determine whether the output pulses generated by relay RLA/2 are generated at a rate representative of a substantially continuous alarm situation obtaining for a predetermined period and to inhibit operation of the alarm, but to cause the alarm to operate if a predetermined sequence of these alarm situations occur in another predetermined period longer than the first-mentioned period. This would reduce the likelihood of a false alarm if, for example, a sensor was being vibrated continuously for relatively long periods. For example, if a person agitated a chain-link fence to which a sensor was fitted with a stick or the like the sensor would be vibrated sufficiently to cause an alarm. It would be useful if the system could recognise this and inhibit the alarm but still provide an alarm if an attempt were made to disguise the fact that a break-in was being attempted by agitating the associated sensor either continuously or at regular intervals in some way.

Figure 4:
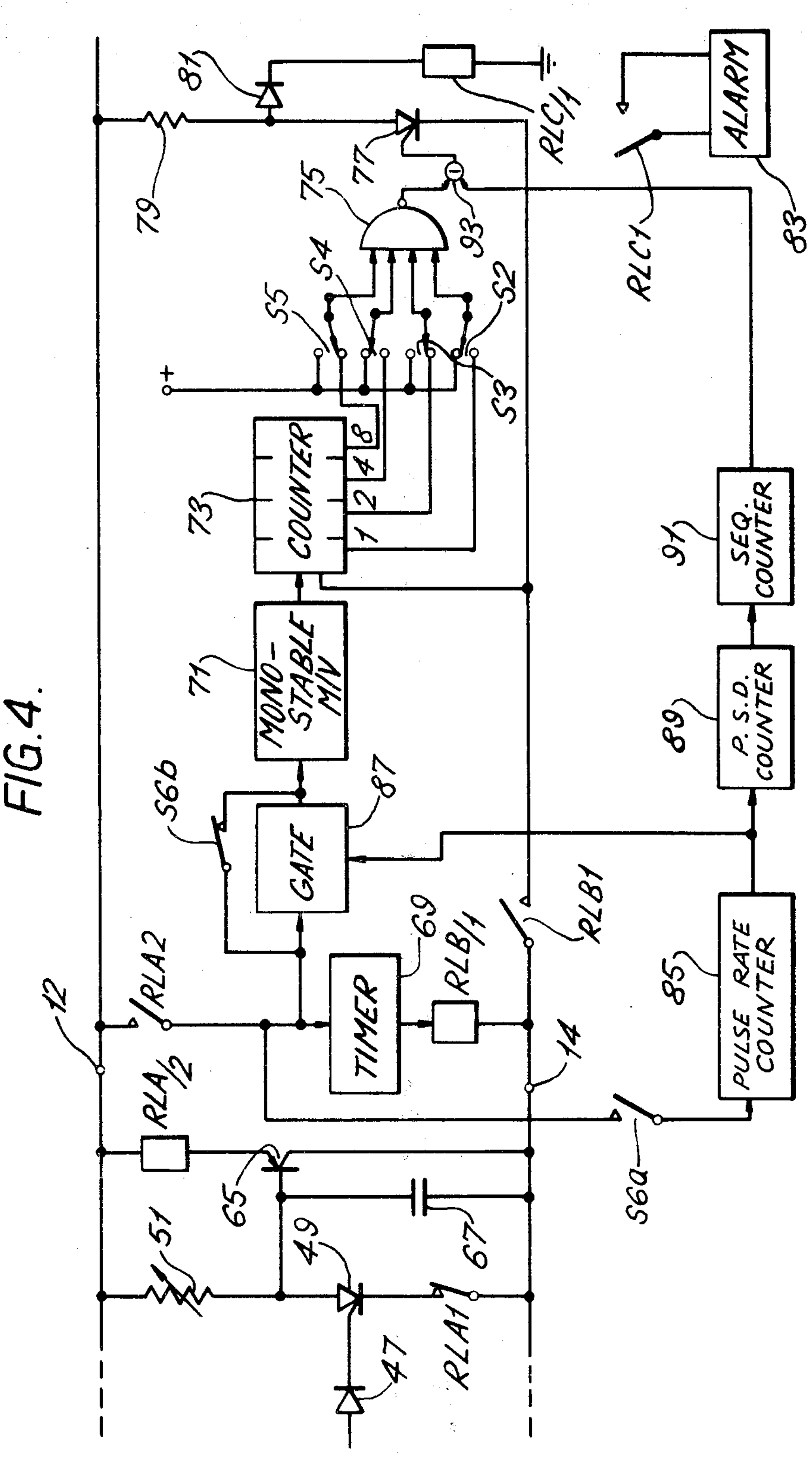
FIG. 4 shows a modification of the circuit arrangement of FIG. 3.

FIG. 4 shows a block diagram of the circuit of FIG. 3 modified to achieve the results adverted to in the preceding paragraph. In FIG. 4 the moving contact of relay contacts RLA2 is coupled through a normally-open switch S6*a* to the input of a pulse rate counter 85 arranged to provide an output signal when the relay is providing output pulses at or near the maximum rate set by resistor 51. The relay contacts RLA2 are now coupled to the monostable circuit 71 by way of a gate 87 and normally-closed switch S6*b* connected in parallel. Switches S6*a* and S6*b* are coupled together. They are not essential but are included to render the additional part of the circuit inoperative during high-risk periods. In operation, the gate is normally-open but is closed when an output signal is generated by the pulse rate counter 85. The output of counter 85 is also coupled to a pulse sequence duration counter 89 which provides an output signal when a continuous output has been received from counter 85 for a predetermined period, typically but not necessarily equal to the period of the timer 69, say *n* seconds. Thus if the output signal from counter 85 consists of a series of pulses, each between *n* and 2*n* seconds then the counter 89 will generate an output signal for each pulse from counter 85. If the counter 85 generates a continuous output signal then the counter will generate an output signal once every *n* seconds. The output of the counter 89 is connected to the input of a sequence counter 91 which can be preset to produce an output signal on receipt of a predetermined number of output signals from counter 89. The count required in counter 91 may, typically be set to the count set in counter 73. The output of counter 91 is coupled through an OR-gate 93 to the control electrode of SCR 77. The output of NAND gate 75 is now also coupled through OR-gate 93 to the SCR 77.

In operation, with switches S6*a* closed and S6*b* open, the counter 85 determines the rate at which pulses are being received at its input. If pulses are being received at a rate equal to or greater than a predetermined rate, the counter 85 generates an output signal which closes (i.e. blocks) the gate 87 to prevent the generation of an alarm signal by way of the path including the counter 73 and NAND gate 75. In addition, if the output signal continues for more than *n* seconds the counter 89 generates an output signal which is counted by sequence counter 91 as described above. When the count in counter 91 equals the preset value an output signal is applied by way of OR-gate 93 to the SCR 77 to thereby actuate the alarm 83.

While systems have been described for use with a source of direct current it is believed that systems according to the invention could be devised using a source of unidirectional pulsating current.

What we claim is:

1. A monitoring system comprising:

a sensor circuit including at least one set of contacts connected in series between terminal means, said terminal means being connectible to a source of current;

output means connected to the sensor circuit for providing, in use, a first output signal in response to actuation of said set of contacts;

pulse generating means responsive to a said first output signal for providing a first output pulse;

timing means responsive to said first output pulse for timing a counting interval and including means for varying the length of said counting interval; and counting means actuable by said timing means for counting the output pulses only during said counting interval and for providing a further output signal when the number of output pulses counted in said counting interval equals or exceeds a predetermined value.

2. A monitoring system according to claim 1 wherein said pulse generating means includes means for determining the maximum pulse repetition rate of the said first output pulses.

3. A monitoring system according to claim 2, wherein the means for determining the maximum pulse repetition rate of the first output pulses comprises means for determining the pulse width of each output pulse.

4. A monitoring system according to claim 3, wherein said output means includes means requiring actuation of said set of contacts at least for a predetermined period before providing a said first output signal, the pulse generating means including a bistate device responsive to said output signal for changing from a first state to a second state when a said set of contacts have been actuated for said predetermined period and responsive to said pulse width determining means for returning to the first state after another predetermined period to thus produce a said output pulse of said pulse width.

5. A monitoring system according to claim 4, wherein the bistate device is a relay and said pulse width determining means is a delay means connected to said relay for maintaining it in its second state for said predetermined period.

6. A monitoring system according to claim 2 in which said counting means includes means for varying the number of pulses which have to be counted to provide the further output signal.

7. A monitoring system according to claim 6, wherein the counting means comprises a counter having a plurality of binary stages and gate means actuable for causing said further output signal when the count in the counter reaches the predetermined value, said means for varying comprising selector means for selectively coupling the output of selected stages of the counter to said gate means.

8. A monitoring system according to claim 7, wherein the counting means includes switch means responsive to actuation of said gate means for providing the further output signal and an indicator means actuating said switch means.

9. A monitoring system according to claim 8, wherein the indicator means comprises an audible alarm generator.

10. A monitoring system according to claim 1 wherein said pulse generating means includes means for varying the pulse width of the output pulses.

11. A monitoring system according to claim 10, wherein the said pulse width is variable between approximately 50 and 1000 milliseconds.

12. A monitoring system according to claim 10, wherein the timing means includes means for varying the length of said counting interval.

13. A monitoring system according to claim 12, wherein the length of said counting interval is variable from approximately 5 seconds to approximately 60 minutes.

14. A monitoring system according to claim 2, wherein the timing means connects to the output of said pulse generating means and is triggered to start and time said counting interval by a said output pulse from said pulse generating means.

15. A monitoring system according to claim 14, wherein said timing means comprises a first monostable multivibrator circuit and means responsive to the output thereof and connected to an enabling input of said counting means for enabling the counting means to count said output pulses only during the said counting interval.

16. A monitoring system according to claim 2 including a pulse shaping means connecting the output of the pulse generating means to the counting means.

17. A monitoring system according to claim 16, wherein the pulse shaping means is a monostable multivibrator.

18. A monitoring system according to claim 2, further comprising means for inhibiting the generation of the further output signal, means for determining the rate at which said first output pulses are generated and providing an intermediate output signal when the first output pulses occur at a rate not less than a predetermined rate and for a predetermined duration, and means for counting the intermediate output signals and for providing another output signal when the number of said intermediate output signals equals or exceeds a further predetermined value.

19. A monitoring system according to claim 18, including indicating means connected to the output of the means for generating said another output signal.

20. A monitoring system according to claim 18, wherein the means for determining the rate at which first output pulses are generated and for providing the intermediate output signal comprises a pulse rate counter having its input coupled to the output of the pulse generating means and said means for counting intermediate signals comprise a pulse sequence duration counter driven by said pulse rate counter.

21. A monitoring system according to claim 20, wherein the means for inhibiting the generation of the further output signal comprises gate means coupled between the output of the pulse generating means and the input of the counting means and control means connected to the output of the pulse rate counter for blocking the gate when the first output pulses occur at a rate greater than or equal to the said predetermined rate.

22. A monitoring system according to claim 1, further comprising control means for causing the circuit to operate in alternative operative modes, wherein in one operative mode actuation of a selected one or more of the sets of contacts is rendered ineffective so that no output signal is provided and in the other operative mode actuation of any one or more sets of contact causes its respective output means to provide an output signal.

23. A monitoring system according to claim 22, wherein said contact sets have both normally-closed and normally-open contacts and wherein the the source is a source of direct current, the control means is arranged to reverse the direction of current flow to change from one operative mode to the other and a respective unidirectional conducting device is connected across the normally-closed contacts of a selected set and/or in series with the normally-open contacts as the case may be.

24. A monitoring system according to claim 1, wherein said contacts comprise several sets of normally closed contacts in series with each other, the sensor circuit including means responsive to actuation of a said set of normally closed contacts for a predetermined time interval to carry out said producing of said output signal, said sensor circuit further comprising a set of normally-open contacts connected in parallel with each other between said terminal means, said output means further including means for providing a second output signal to said pulse generator means upon actuation of said set of normally-open contacts, said pulse generating means being capable of providing a said first output pulse in response to either a said first or second output signal.

25. A monitoring system according to claim 24 wherein a set of normally-closed and normally-open contacts is an integral unit comprising a pair of contacts for connection in series in the sensor circuit and a third contact for effecting a parallel connection, and movable means having a first position wherein it short circuits the said pair of contacts and another position wherein it short circuits one contact of the pair with the third contact.

26. A monitoring system according to claim 1, wherein the output means comprise a timer circuit for providing the first output signal after continuous actuation of a set of contacts for a predetermined period and means for varying the length of the period.

27. A monitoring system according to any claim 1, wherein the output means comprises an integrating means for providing the first output signal after continuous actuation of a set of contacts for a predetermined period and means for varying the time constant of integration to vary the predetermined period.

28. A monitoring system according to claim 1, wherein said source is a d.c. source and including means connected in series with said terminal means and set of contacts for changing the d.c. level of the current flowing in the sensor circuit due to actuation of said contact set.

29. A monitoring system according to claim 1, wherein said contact set comprises two normally-closed contacts having a loosely constrained movable member normally connecting the two contacts and vibrateable between closed and open positions of the contacts to pulsate the current in the sensor circuit.

30. A monitoring system according to claim 1 wherein said contact set comprises a set of normally-closed contacts additionally provided with a third, normally-open contact connected in parallel across the terminal means and the set has a movable member having one operative state in which it vibrates between the closed and open positions of the normally-closed contacts and another operative state in which the normally-closed contacts are opened and contact is made between one of the normally-closed contacts and the third, normally-open contact substantially to short-circuit the terminal means.

31. A monitoring system according to claim 1 wherein said pulse generating means comprises a variable resistor and a timing capacitor chargeable thereby connected in series across said terminal means, a transistor and a first relay actuable thereby connected in series across said terminal means, an SCR connected in series with a first normally-closed contact of said first relay across said capacitor, said SCR having a gate electrode actuable by said first output signal, means conductive in response to actuation of said SCR for discharging said capacitor and for causing said transistor to actuate said first relay, wherein said capacitor maintains said transistor conductive through said first relay for a period set by said adjustable resistor, said first relay contact being responsive to actuation of said relay for disabling said SCR, said first relay having a second normally-open contact closeable to one said terminal means upon actuation of said relay for providing said output pulse, the width of said output pulse being determined by the recharge time of said capacitor and the pulse repetition rate being limited by the open time of said first relay contact;

said timing means comprising a monostable multivibrator and a second relay connected in series with said second relay contact across said terminal means, said second relay having a normally-open third relay contact closed during said counting interval for providing operating potential from said terminal means to said counting means and thereby enabling said counting means for counting upon actuation of said monostable multi-vibrator by said output pulse;

said counting means comprising a further monostable multi-vibrator connected to said second relay contact for receiving and shaping output pulses therefrom, a binary counter connected for receiving shaped output pulses from said second multi-vibrator and having several stages with corresponding count output lines, manually adjustable selector switch means having contacts alternatively connectible between a potential source and a corresponding counter output line, gate means having plural inputs connected to respective ones of said selector contacts and responsive to a common logic level from each of said inputs for providing said further output signal;

alarm means and switch means connected between the output of said gate and said alarm means and responsive to said further output signal for actuating said alarm means.

32. A monitoring system according to claim 1 including pulse rate counter means connected to said pulse generating means and responsive to the first output pulses for providing an output when the repetition rate of first output pulses at least approaches a maximum rate, said pulse generating means including means setting the maximum rate at which it will produce output pulses regardless of the character of said first output signal applied thereto;

normally conductive gate means interposed between said pulse generating means and counting means for normally permitting counting of said output pulses by said counting means, said gate means being responsive to said pulse rate counter output for blocking the pulse input into said counting means;

pulse sequence duration counter means connected to the output of said pulse rate counter means and responsive to a continuous output therefrom for a predetermined interval having a preselected relation to said counting interval, wherein said pulse sequence duration counter means provides a pulse for each pulse rate counter means output lasting said predetermined period;

sequence counter means responsive to a predetermined number of pulses from said pulse sequence duration counter means for producing a second further output signal;

OR function means having inputs coupled to said counting means and said sequence counter means and responsive to either of a said further output signal or a said second further output signal, respectively, for causing a system output.

33. A monitoring system comprising:

a sensor circuit including at least one set of normally-closed contacts connected in series between terminal means, said terminal means being connectible to a source of current, said sensor circuit further including at least one set of normally-open contacts connected in parallel with each other between said terminal means;

output means connected to said sensor circuit for providing, in use, a first output signal upon actuation of a said set of normally-closed contacts for a predetermined time interval;

pulse generating means responsive to at least said first output signal for providing a first output pulse;

timing means responsive to said first output pulse for timing a counting interval and including means for varying the length of said counting interval; and counting means actuable by said timing means for counting the output pulses during said counting interval and for providing a further output signal when the number of pulses counted in said counting interval equal or exceeds a predetermined value.

34. A monitoring system according to claim 33, wherein the output means includes means for varying the length of said predetermined time interval.

35. A monitoring circuit according to claim 33, wherein the output means comprises an integrating means for providing the first output signal.

36. A monitoring system according to claim 33, wherein the output means includes means for rapidly resetting the level of said first output signal upon deactuation of the corresponding switch contacts.

* * * * *